United States Patent
Frey et al.

(10) Patent No.: US 7,735,922 B2
(45) Date of Patent: Jun. 15, 2010

(54) PASSENGER SEAT WITH ADJUSTABLE SEAT DEPTH

(75) Inventors: Andreas Frey, Immenstaad (DE); Jurgen Bauer, Sulzbach (DE)

(73) Assignee: Recaro Aircraft Seating GmbH & Co., KG, Schwäbisch Hall (DE)

( * ) Notice: Subject to any disclaimer, the term of this patent is extended or adjusted under 35 U.S.C. 154(b) by 838 days.

(21) Appl. No.: 11/072,253

(22) Filed: Mar. 7, 2005

(65) Prior Publication Data

US 2006/0138846 A1   Jun. 29, 2006

(30) Foreign Application Priority Data

Dec. 7, 2004  (DE) ........................ 10 2004 059 036

(51) Int. Cl.
    *A47C 7/14* (2006.01)
(52) U.S. Cl. ................................. 297/284.11
(58) Field of Classification Search ............. 297/284.11
    See application file for complete search history.

(56) References Cited

U.S. PATENT DOCUMENTS 4,623,192 A * 11/1986 Koide et al. ............ 297/284.11
4,629,248 A * 12/1986 Mawbey ................. 297/284.11
5,560,681 A    10/1996 Dixon et al.
5,599,062 A *  2/1997 Hagedorn et al. ... 297/284.11 X
6,578,915 B2 * 6/2003 Jonas et al. ............ 297/284.11

FOREIGN PATENT DOCUMENTS

DE        41 04 697 A1    8/1992

* cited by examiner

*Primary Examiner*—Anthony D Barfield
(74) *Attorney, Agent, or Firm*—Roylance, Abrams, Berdo & Goodman, L.L.P.

(57) ABSTRACT

A passenger seat, an aircraft passenger seat in particular, has seat components such as a seat frame (20), a backrest (12), and a seat cushion carrier (30) with seat cushion (16). The seat depth between backrest (12) and a seat front edge (26) can be varied by an adjustment mechanism (32) with an energy accumulator, such that the seat depth is adjustable and fastenable in desired adjustment positions. The adjustment mechanism has at least one variable-volume energy accumulator. An adjustment position of the seat depth may be associated with each volume level. The seat depth adjustment may be effected essentially free of mechanical components such as sets of levers.

14 Claims, 1 Drawing Sheet

PASSENGER SEAT WITH ADJUSTABLE SEAT DEPTH

FIELD OF THE INVENTION

The present invention relates to a passenger seat, particularly an aircraft passenger seat, having a seat frame, a backrest, and a seat cushion carrier with a seat cushion. The seat depth between backrest and seat front edge is adjustable by means of an adjustment mechanism with an energy accumulator, and is fastenable in desired adjustment positions.

BACKGROUND OF THE INVENTION

An aircraft passenger seat with an adjustable seat depth is disclosed in U.S. Pat. No. 5,560,681. The changing of the seat depth within certain limits in the case of such seats significantly contributes to the comfort of the seat occupant. The distance between seat front edge and backrest may be adjusted to the distance between the hollow of the knee and the buttocks of a particular seat occupant. This adjustment is an advantage in the case of seats for commercial aircraft, in which an effort must be made to achieve maximum seat comfort in view of the extended duration of the flights involved. Adjustment of the seat depth is also favorable in the case of such seats if a folding or pivoting leg rest adjoins the seat front edge.

Adjustment of the seat depth is also important for modern aircraft passenger seats, as are used in the business class and first class compartments (see, e.g., DE 102 20 248 C1). Such seat can form a bed position in which the back-tilted backrest is designed to form an essentially integrated reclining surface together with the seat component and the leg rest, even for taller individuals. The additional reclining surface achieved with the extended leg rest still would not be enough to create in the aggregate a long total reclining surface. As a result of the additional displacement of the seat front edge forward, the leg rest is moved forward as a result of coupling of this leg rest with the seat frame or seat cushion carrier. If the support surface in this reclined position is lacking, an extension movement of 3 to 6 centimeters may be enough to create a pleasant comfort or bed position, even for very tall individuals. An additional advantage is achieved in that any gap between the upper end of the leg rest and the seat cushion carrier is closed.

U.S. Pat. No. 5,560,681 discloses an actuating or adjustment mechanism including a set of levers mounted between seat frame and seat cushion carrier, and pretensioning a pressure spring for movement displacing the seat cushion carrier to increase the seat depth so as to make a clear-cut seat depth adjustment possible. In the disclosed solution, the pressure spring normally is blocked by a hydraulic cylinder, which cylinder may be unblocked by hydraulic means, so that the force of the released spring displaces the seat cushion carrier forward. To move the seat cushion carrier again to reduce the seat depth, the seat occupant must unblock the hydraulic cylinder and move the seat cushion carrier back manually against the force of the pressure spring.

Aside from the exertion of effort by the seat occupant and a corresponding expenditure of force required of the seat occupant to reduce the seat depth, the structural configuration of the actuating mechanism in the form of a set of levers with a pressure spring and a hydraulic cylinder provided for blocking in seats of this type is relatively large. The structural space required for the structural component and associated link joints is a disadvantage. In particular, the large number of components results in a high weight for the respective aircraft passenger seat, something which is undesirable for obvious reasons (e.g., fuel costs). In addition, continuously reliable operation is not always guaranteed, because of the complexity of the lever mechanism.

SUMMARY OF THE INVENTION

Objects of the present invention are to provide a passenger seat, an aircraft passenger seat in particular, affording the seat occupant relatively greater ease of operation in adjusting the seat depth and having a simplified, light-weight, and space-saving construction of the seat depth adjustment mechanism.

These objects are attained by the adjustment mechanism having at least one variable-volume energy accumulator. A seat depth adjustment position may be associated with each volume level, with a seat adjustment carried out essentially free of mechanical components, such as sets of levers. Use of a variable-volume energy accumulator permits great ease of operation. In contrast to the seat disclosed in the U.S. Pat. No. 5,560,681, adjustments may be made in both directions without application of manual force. In addition, the respective variable-volume energy accumulator may be configured in a light-weight, space-saving design. Hydraulic unblocking may be omitted for highly reliable operation.

Preferably, the energy accumulator includes at least one accumulator bag with at least one flexible enclosing wall. The accumulator bag may be charged with and emptied of a fluid pressure medium (e.g., ambient air). A supply pump (vacuum pump) may easily be controlled and actuated by a seat occupant or operator (cabin personnel). The operating air for the energy accumulator is taken from the current on-board supply system of an aircraft.

To ensure complete emptying of the accumulator bag for the front edge of the seat to be in the rearmost position and the seat adjustment depth to be the smallest, the accumulator bag is charged with the medium (ambient air) in the initial state. The front edge of the seat is moved into the extended position as the seat depth increases. The seat depth then returns in the direction of an emptied or vacuumized accumulator bag to the initial value at which the front edge of the seat is moved back in the direction of the rest of the seat component. Obstacles to operation are thereby prevented and complete emptying of the accumulator bag to the extent necessary is ensured. Depending on the charging state, the seat front edge may also be stopped in intermediate positions by the seat occupant as required or desired. A high number of seat variations may be obtained. In addition, the repositioning of the seat front edge may be supported by elastic materials of the seat component cushion and/or the cushion cover material.

By preference, the energy accumulator may be supported in the direction of the seat component so that movement forward may be exclusively in the direction of the seat front edge. If, by preference, a pouch or pouch receptacle is provided in the cushion materials of the seat, the accumulator bag may be replaced by simple means and connected to the respective supply pump. In place of an accumulator bag of an elastomer material, the accumulator bag itself may also be made of a large-pore foam which, preferably surrounded by a pouch, may be further inflated by means of the supply pump and the medium to effect an extension process for the seat front edge. Since the foam material of the cushion component essentially continues to be in the accumulator bag, the seat occupant cannot discern the difference in materials, contributing to increased seating comfort.

The accumulator bag may comprise an individual elongated balloon-shaped element. Multiple-compartment systems extending down to individual accumulator spheres are also possible. The spheres can be accommodated in an accumulator pouch and can be suitably inflated by the action of a medium for the purpose of increasing the volume of the energy accumulator.

Use of ambient air as the medium results in reduced weight. Reduced weight is also provided by the supply pump being configured as an air and/or vacuum pump. Ambient air may also be replaced by another medium, such as nitrogen gas, a hydraulic fluid, and/or a gel-like substance which can be pumped.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
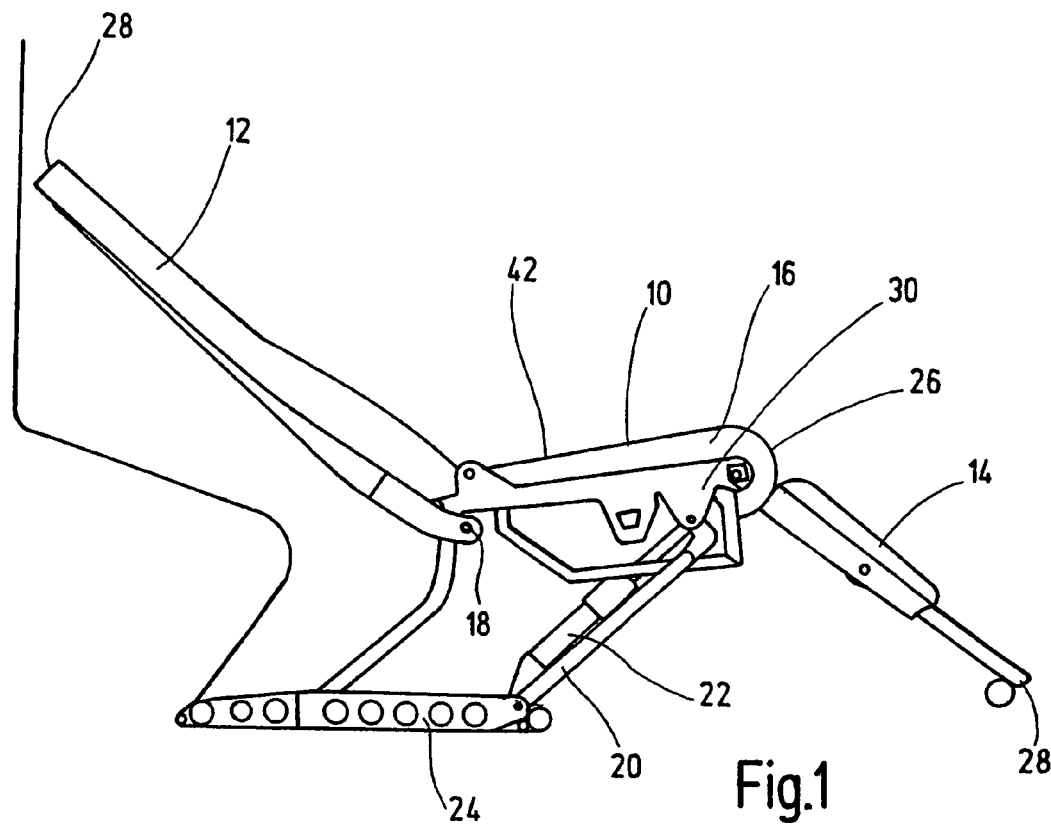
FIG. 1 is a side view of an aircraft passenger seat illustrating the basic mechanical structure of a passenger seat according to an embodiment of the present invention.

FIG. 1 shows an aircraft passenger seat in partly tilted position (comfort position). Such aircraft passenger seats with the corresponding level of equipment are often found in the first-class area of long-haul aircraft. The seats may also be found in luxury-equipped long-distance buses or passenger ships, including ferries, as well as in medical facilities, such as operating rooms. The aircraft passenger seat shown in FIG. 1, for example, is a component of a compartment. As is shown in this figure, the seat is spatially separated from the following seats or seat groups. Aircraft passenger seats may be placed side by side in rows in the business class area in a conventional multiple-seat arrangement.

The aircraft passenger seat is made up of individual seat components, including a seat element 10, a backrest 12, and a leg rest 14. For the sake of greater clarity of illustration, only the top part of the cushion carrier 16 is shown as an essential part of the seat element. This makes it possible to make the underlying aircraft seat components at least partly visible.

The backrest 12 is pivotable around an articulated position or point 18 by a first operating mechanism (not shown) to a position inclined relative to a base position of a seat element 10 extending essentially horizontally. The seat element 10 is also pivotable, by way of a four-joint frame 20 having a positioning mechanism 22 configured as an actuator. The four-joint frame 20 may be suitably mounted on the cabin floor by seat rails 24. The leg rest 14 may be extended longitudinally and be pivotally connected by a third operating mechanism (not shown) adjacent its upper side in the area of the seat front edge. The leg rest 14 is omitted from FIG. 2 for the sake of greater clarity of presentation.

The various seat components are controlled by different operating mechanisms, as is customary in such seats. Accordingly, these mechanisms will not be discussed in greater detail. In addition, due consideration is given to light-weight design for the seat as a whole, so that the corresponding payload may be increased. In addition, the aircraft passenger seat may be outfitted with a monitoring mechanism, such as one in the form of a computer unit, including a short-process computer or the like. The monitoring mechanism (not shown) may be used to monitor collision-based edge geometries 28 of the movable seat components. The cushion 16 rests on a seat cushion carrier 30, and as seen in the cross-section of FIG. 2, is provided at the seat front edge 26 with an arched end.

Figure 2:
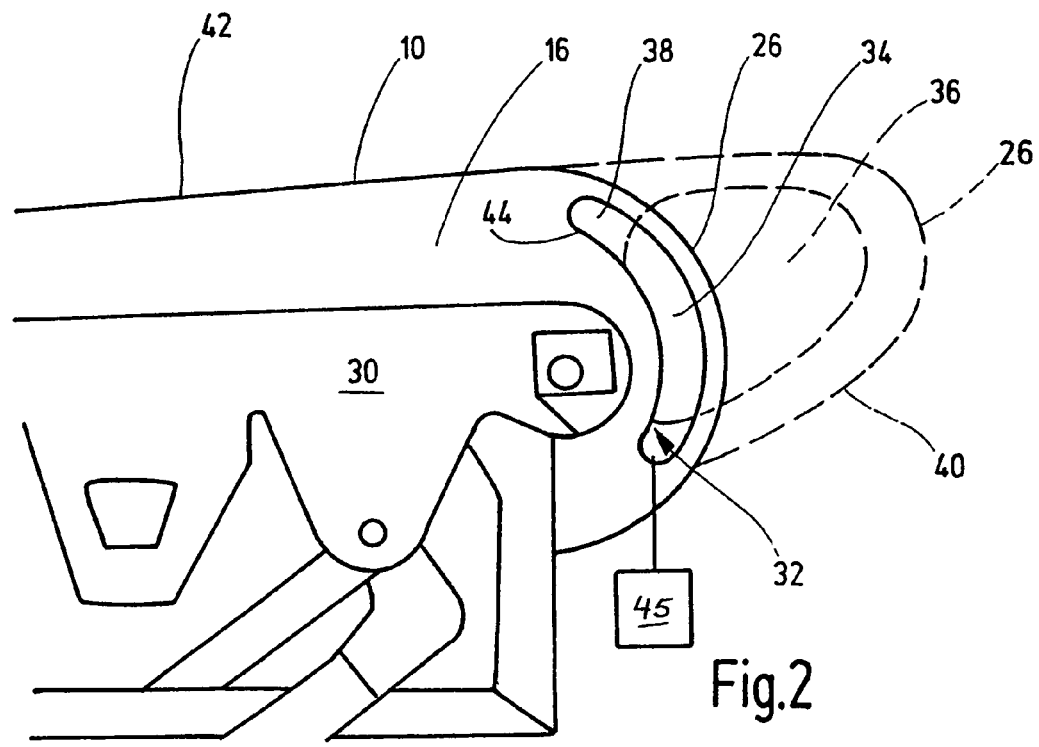
FIG. 2 is an enlarged side elevational view in section of the area of the front edge of the seat of FIG. 1.

An adjustment mechanism 32, which for the sake of greater simplicity of illustration, is shown only in FIG. 2. The adjustment mechanism may be used to adjust the seat depth, as measured between backrest 12 and seat front edge 26 to fix the front edge in desired adjustment positions. The extreme or maximum retracted position is illustrated in FIG. 1 and on the left in solid lines in FIG. 2. The extended position is shown in broken lines on the right in FIG. 2 in which the seat front edge 26 has been moved in the forward direction of the seat to increase the seat depth. The adjustment mechanism 32 has at least one variable-volume energy accumulator. Each volume level 34, 36 of the accumulator is associated with a seat depth adjustment position. Preferably, an accumulator bag 38 is used as the energy accumulator. This accumulator bag 38 is shown in solid lines on the left in FIG. 2 with its minimum volume and in broken lines on the right with correspondingly increased volume. For this purpose the accumulator bag 38 has an elastic enclosing wall 40 which may be charged with and emptied of a medium. A fluid, e.g., an operating gas such as ambient air in particular, may be used as the medium.

In the initial state (illustrated on the right by broken lines), the accumulator bag 38 is charged to the maximum with the medium, and the seat front edge 26 is accordingly moved to the front extended position as the seat depth increases. With the emptied or vacuumized accumulator bag 38 (left position indicated by a continuous line), the seat depth returns to the original value, in which the seat front edge 26 has essentially been moved back in the direction of the seat element 10 and backrest 12 until the original value has been reached, as is shown in FIG. 1. The configuration makes certain that the accumulator bag 38 may be completely emptied to ensure that the seat may return to the initial state. The option also exists, however, of the initial position being the retracted state and the extended position being the actuated state. The seat front edge 26 may be fastened in intermediate stages between the extreme positions shown in FIG. 2 as a function of the state of charging of the accumulator bag 38. Accordingly, the greatest possible flexibility is achieved in this situation.

The repositioning of the seat front edge 26, as illustrated, may be supported by elastic materials of the seat cushion 16 and/or of the cushion cover material 42. It would also be possible to separate the seat cushion 16 so that only the front element would be carried along with the front element of the accumulator bag 38 and any resulting gap could be covered by elastic cover materials 42.

On its side facing the seat cushion carrier 30, the energy accumulator in the form of the accumulator bag 38 rests on this carrier and/or other frame elements (not shown). In addition, retaining mechanisms, which may also include the cover materials themselves and/or of compressed cushion foam material, could be provided inside the cushion foam. The measures involved make certain that the energy accumulator, in particular in the form of the accumulator bag 38, does not move in the direction of the backrest 12 and potentially hamper the optional extension movement of the seat front edge 26. The accumulator bag 38 may be introduced into a pouch 44 or into a pouch receptacle in the area of the seat front edge 26 to permit quick replacement of this bag should it be damaged. The accumulator bag, as shown in FIG. 2, includes consists of an elongated one-piece accumulator tube, the greatest extension of which when not actuated (drawing on the left in solid lines) is oriented along the seat front edge 26. Such tube is reduced in extension in the direction transverse to its longitudinal extension for the greatest extension of the seat front edge.

The accumulator bag 38, along with its enclosing wall 40, is made of a flexible rubber material known to be used in configurations in hydraulic accumulator design. The interior of the accumulator bag 38 may be connected to a supply pump 45 permitting inflation of the accumulator bag 38, as well as vacuum removal of the interior volume of the accumulator for a repositioning process. The accumulator bag 38 may also be replaced by a plurality of individual bag systems. The individual bag systems provide the option of increasing the possible adjustments even further. The rubber accumulator bag 38 illustrated may also be replaced by a large-pore foam or the accumulator bag itself may consist of a large-pore foam and be introduced, for example, into the pouch 44. A relatively small amount of medium or air then suffices for increasing the volume of the accumulator bag 38 or, in the opposite direction, of reducing it. The configuration of the present invention permits increasing the seat depth. Thus, the reclining position support area may be appreciably increased in modern seat systems with reclining comfort, something which, because of the cramped installation conditions, could not be accomplished with the extensible leg rest 14 alone.

While one embodiment has been chosen to illustrate the invention, it will be understood by those skilled in the art that various changes and modifications can be made therein without departing from the scope of the invention as defined in the appended claims.

What is claimed is:

1. A passenger seat, comprising:
   a backrest;
   a seat frame coupled to said backrest;
   a seat cushion carrier with a seat cushion mounted on said seat frame, said seat cushion having a front edge; and
   an adjustment mechanism coupled to said seat cushion for moving said front edge relative to said backrest and fixing said front edge in various adjusted positions relative to said backrest, said adjustment mechanism including at least one variable-volume energy accumulator bag having at least one elastomeric enclosing wall biasing said front edge toward a retracted position, each of said adjusted positions being associated with one volume level of said accumulator bag, said bag being chargeable with and emptiable of a pressure medium, said accumulator bag being charged with said medium in an initial state to locate said front edge in an extended position with increased seat depth, and emptied or evacuated to locate said front edge in said retracted position with decreased seat depth.

2. A passenger seat according to claim 1 wherein said medium is a fluid.

3. A passenger seat cording to claim 2 wherein said fluid is a gas.

4. A passenger seat according to claim 3 wherein said gas is ambient air.

5. A passenger seat according to claim 1 wherein said accumulator bag comprises a first side facing said seat cushion carrier, said first side resting on one of said seat cushion carrier, said seat frame, cover material and compressed cushion foam material.

6. A passenger seat according to claim 1 wherein said accumulator bag is located in a pouch between cushion materials in an area of said front edge.

7. A passenger seat according to claim 1 wherein said accumulator bag comprises an elongated accumulator tube with a longest dimension thereof extending along said front edge, and with a transverse dimension perpendicular to said front edge smaller than said longest dimension.

8. A passenger seat according to claim 1 wherein said accumulator bag is connected to a supply pump.

9. A passenger seat according to claim 1 wherein said accumulator bag encloses large-pore foam.

10. A passenger seat according to claim 1 wherein said accumulator bag is formed of large-pore foam.

11. A passenger seat according to claim 1 wherein said accumulator bag is housed in said seat cushion adjacent said front edge, said accumulator bag being expandable and contractible.

12. A passenger seat according to claim 11 wherein said accumulator bag is restrained from expanding toward said backrest.

13. A passenger seat according to claim 11 wherein said accumulator bag is restrained to expand and contract only in directions moving said front edge respectively toward and away from said backrest.

14. A passenger seat according to claim 1 wherein said accumulator bag extends along only said front edge.

* * * * *